United States Patent
Haeusser

(10) Patent No.: US 10,598,295 B2
(45) Date of Patent: Mar. 24, 2020

(54) VALVE ROTOR FOR A SOLENOID VALVE, AND VALVE CARTRIDGE FOR A SOLENOID VALVE

(71) Applicant: Robert Bosch GmbH, Stuttgart (DE)

(72) Inventor: Bernd Haeusser, Neckarwestheim (DE)

(73) Assignee: Robert Bosch GmbH, Stuttgart (DE)

(*) Notice: Subject to any disclaimer, the term of this patent is extended or adjusted under 35 U.S.C. 154(b) by 0 days.

(21) Appl. No.: 15/417,958

(22) Filed: Jan. 27, 2017

(65) Prior Publication Data
US 2017/0219112 A1    Aug. 3, 2017

(30) Foreign Application Priority Data
Feb. 1, 2016  (DE) .................. 10 2016 201 474

(51) Int. Cl.
| | |
|---|---|
| *F16K 31/06* | (2006.01) |
| *F16K 25/00* | (2006.01) |
| *B60T 8/36* | (2006.01) |
| *B60T 15/00* | (2006.01) |

(52) U.S. Cl.
CPC .............. *F16K 25/00* (2013.01); *B60T 8/363* (2013.01); *F16K 31/06* (2013.01); *F16K 31/0686* (2013.01); *B60T 15/00* (2013.01); *F16K 31/0689* (2013.01); *F16K 31/0696* (2013.01)

(58) Field of Classification Search
CPC ...... F16K 31/0686; F16K 25/00; F16K 31/06; F16K 31/0689; F16K 31/0692; B60T 15/00; B60T 8/363

USPC ................................. 251/22, 48
See application file for complete search history.

(56) References Cited

U.S. PATENT DOCUMENTS

| | | | | |
|---|---|---|---|---|
| 7,661,652 | B2* | 2/2010 | Acar | B60T 8/363 137/599.01 |
| 2004/0155212 | A1* | 8/2004 | Hess | F01P 7/14 251/64 |
| 2007/0069166 | A1* | 3/2007 | Sisk | F16K 31/0655 251/64 |
| 2013/0207016 | A1* | 8/2013 | Schubitschew | B60T 8/363 251/129.15 |
| 2014/0367597 | A1* | 12/2014 | Courth | B60T 8/363 251/129.15 |
| 2015/0130265 | A1* | 5/2015 | Leventhal | F16K 31/0696 303/10 |

FOREIGN PATENT DOCUMENTS

| | | |
|---|---|---|
| CN | 101036014 A | 9/2007 |
| CN | 104011369 A | 8/2018 |
| DE | 10 2007 051 557 A1 | 4/2009 |
| DE | 102009046079 | * 5/2011 |
| DE | 102011089288 | * 2/2013 |

* cited by examiner

*Primary Examiner* — Umashankar Venkatesan
(74) *Attorney, Agent, or Firm* — Maginot, Moore & Beck LLP

(57) ABSTRACT

A valve rotor for a solenoid valve includes a base body and a ram that cooperates with a valve seat. A damping device is arranged between the ram and the base body. The damping device has a cavity that is configured to be filled with a damping medium and a choke opening through which the damping medium flows into or out of the cavity. The damping device damps a pulse that occurs when the ram hits the valve seat. A valve cartridge includes the valve rotor.

19 Claims, 3 Drawing Sheets

VALVE ROTOR FOR A SOLENOID VALVE, AND VALVE CARTRIDGE FOR A SOLENOID VALVE

This application claims priority under 35 U.S.C. § 119 to patent application no. DE 10 2016 201 474.9, filed on Feb. 1, 2016 in Germany, the disclosure of which is incorporated herein by reference in its entirety.

BACKGROUND

The disclosure is based on a valve rotor for a solenoid valve, and an associated valve cartridge for a solenoid valve.

Normally open or normally closed solenoid valves are known from the prior art, which are used for example as inlet valves or outlet valves in a hydraulic assembly of a vehicle braking system. Via the hydraulic assembly, control and/or regulation processes are performed in an anti-lock braking system (ABS) or a traction control system (ASR) or an electronic stability program system (ESP), in order to build up or reduce pressure in corresponding wheel brake calipers. Such solenoid valves comprise a magnet assembly and a valve cartridge. The valve cartridge comprises a pole core, a guide sleeve connected to the pole core, and a valve rotor guided axially movably inside the guide sleeve against the force of a return spring between a closed position and an open position. The valve rotor may comprise a base body and a ram. In the closed position, the ram cooperates tightly with a valve seat and interrupts a fluid flow between at least one first flow opening and at least one second flow opening. In the open position, the ram is raised from the valve seat and allows the fluid flow between the at least one first flow opening and the at least one second flow opening. Powering the magnet assembly generates a magnetic force which, in a normally open solenoid valve, moves the base body with the ram from the open position to the closed position until the ram hits the corresponding valve seat and seals this. In unpowered state, the return spring moves the base body with the ram, and the ram lifts away from the valve seat and opens it. In a normally closed solenoid valve, by powering the magnet assembly, the base body with the ram is moved from the closed position to the open position, and the ram lifts away from the valve seat and opens it. When the power is switched off, the return spring moves the base body with the ram in the direction of the valve seat until the ram hits the valve seat and closes it. The solenoid valves described thus generate a closing noise when the ram, which comprises a closing body configured for example as a steel ball and/or as a dome, hits the valve seat consisting for example of hardened steel.

Publication DE 10 2007 051 557 A1 describes for example a normally closed solenoid valve for a slip-controlled hydraulic vehicle braking system. The solenoid valve comprises a hydraulic part called the valve cartridge, which is arranged partially in a stepped bore of a valve block, and an electric part formed substantially from a magnet assembly which is pushed onto the part of the valve cartridge protruding from the valve block. The magnet assembly comprises a coil body with an electric winding, a coil casing conducting magnetic flux, and a ring disc conducting magnetic flux. The hydraulic part has a guide sleeve which, on its end facing the hydraulic part, is closed by a pressed-in pole core welded fluid-tightly. A longitudinally displaceable rotor is received in the guide sleeve and supported on the pole core by a return spring. Facing away from the pole core, the rotor has a spherical closing body arranged in a recess. On the end facing away from the pole core, a pot-shaped valve sleeve, with a cylindrical casing and a floor, is pressed into the guide sleeve. The valve sleeve has a passage on the floor and a valve seat in the form of a hollow cone, which together with the closing body forms a seat valve. The seat valve allows a switchable fluidic connection between the passage in the floor of the valve sleeve and at least one passage in the casing of the valve sleeve. Also, a radial filter is arranged on the outside of the casing of the valve sleeve, to filter dirt particles from the fluid flow. The guide sleeve can be fixed in the stepped bore of the valve block with a fixing bush.

SUMMARY

The valve rotor according to the disclosure for a solenoid valve, and the corresponding valve cartridge for the solenoid valve, have the advantage here that, due to the modification of the valve rotor, which comprises a base body and a ram, the closing noise occurring on closure can be reduced and in the ideal case suppressed almost completely. By use of a damping device arranged between the ram and the base body, and a cavity that can be filled with a damping medium and a choke opening through which the damping medium flows out of the cavity or into the cavity, the pulse from impact of the ram on the valve seat can be damped, so that the body-borne sound in the system can advantageously be reduced. The closing noise occurring on closure can be further reduced by a decelerating braking of the moved mass of the ram, in that the damping medium flows out of the cavity when the ram acts on the cavity.

Thus embodiments of the present disclosure contribute to improving the NVH behavior (noise, vibration and harshness) of the vehicle, in that the disruptive noise occurring on closure of the solenoid valve is reduced and in the best case avoided completely. This allows the vehicle braking system to be designed as a single box system and the hydraulic assembly to be bolted directly onto the bulkhead of the vehicle, since no disruptive closing noise can reach the interior.

Embodiments of the present disclosure propose a valve rotor for a solenoid valve which has a base body and a ram cooperating with a valve seat. Here, between the ram and the base body, a damping device is arranged which has a cavity that can be filled with a damping medium and a choke opening through which the damping medium flows out of the cavity or into the cavity, wherein the damping device damps a pulse occurring when the ram hits the valve seat.

Also, a valve cartridge is proposed for a solenoid valve with a pole core, a guide sleeve connected to the pole core, a valve rotor which is guided axially movably inside the guide sleeve against the force of a return spring between a closed position and an open position and which comprises a base body and a ram, and with a valve seat connected to the guide sleeve and arranged between at least one first flow opening and at least one second flow opening. In the closed position, the ram cooperates tightly with the valve seat and interrupts a fluid flow between the at least one first flow opening and the at least one second flow opening. In the open position, the ram is raised from the valve seat and allows the fluid flow between the at least one first flow opening and the at least one second flow opening.

The measures and refinements listed in the dependent claims lead to advantageous improvements of the valve rotor for a solenoid valve, and of the valve cartridge for a solenoid valve.

It is particularly advantageous that the damping behavior of the damping device can be influenced by the dimensions of the choke opening. For example, a pressure exerted by the ram can be compensated more quickly by a large choke opening than by a comparatively small choke opening, since the larger choke opening allows a faster outflow of the damping medium from the cavity. This advantageously allows a simple and economic production of the damping device, the damping behavior of which can easily be adapted to the model of the solenoid valve or the model of the valve cartridge.

In a further advantageous embodiment of the valve rotor according to the disclosure, the choke opening may be configured as a groove. Advantageously, a groove can easily be worked into a wall of the cavity, for example the inner wall of the ram.

In a further advantageous embodiment of the valve rotor according to the disclosure, the ram may have a recess on its end region facing the base body, and the base body may have an end wall at an end region facing the ram, wherein the end wall and the recess form the cavity of the damping device. Advantageously, the defined cavity between the ram and the base body weakens in a targeted fashion the stiffness of the mechanical interface between the ram and the base body, thus acting as a springing element, wherein the end wall of the base body in the closed state lies on the edge of the recess. Due to the reduced stiffness and predefined damping behavior of the interface, advantageously a further noise reduction can be achieved. Furthermore, the cavity may be produced easily by the recess in the ram and the connection of the ram with the base body. This substantially prevents the ram from jumping when it hits the valve seat, since the damping behavior of the mechanical interface can be predefined via the wall thickness of the ram and the dimensions of the choke opening. Furthermore, the braking effect of the damping device, as well as reducing noise, also prevents damage to the ram on an end region facing the valve seat. Here, on the end region facing the valve seat, the ram may have a closing body which can preferably be designed as a spherical cap. In the closed position, the closing body may lie tightly against the valve seat and seal this.

In a further advantageous embodiment of the valve rotor according to the disclosure, the base body may comprise a magnetizable material. The magnetizable material allows the base body to be attracted to or repelled by the pole core. The magnetic force moves the base body against a spring force between the open position and the closed position, or between the closed position and the open position. The base body may for example be made of iron. Furthermore, the base body may be configured as a sintered component.

In a further advantageous embodiment of the valve rotor according to the disclosure, the ram may be configured as a plastic injection molding. Advantageously, rams with different dimensions and recesses can be produced easily by injection molding methods. Also, plastic injection moldings may be produced economically from thermoplastics for example. Furthermore, a ram produced as a plastic injection molding, in comparison with a metallic ram, creates less disruptive noise on impact with the valve seat.

In a further advantageous embodiment of the valve rotor according to the disclosure, the ram and the base body are connected together by a press joint. Here, an end region of the ram facing the base body may lie, with the regions surrounding the recess, on a contact face of the base body facing the ram. The cavity is created between the ram and the base body due to the recess in the ram. The choke opening is then made in a wall of the ram recess.

In a further advantageous embodiment of the valve rotor according to the disclosure, an inner wall of the ram, in the region of the press joint, may have a contour via which the damping medium can flow into the cavity or out of the cavity. Furthermore, the contour can advantageously compensate for different temperature expansion coefficients of the different materials. Also, the base body may comprise a groove or a recess which, in the connecting region between the base body and ram, with the contour of the ram, allows the damping medium to flow into or out of the cavity.

In an advantageous embodiment of the valve cartridge, the fluid which, in the open position, flows between the first flow opening and the second flow opening, may flow into the cavity between the base body and the ram and form the damping medium. Advantageously, the damping medium is already present and can flow into or out of the cavity via an inlet or outlet formed by the contour of the ram and the groove of the base body.

An exemplary embodiment of the disclosure is shown in the drawing and is explained in more detail below. In the drawing, the same reference numerals designate components or elements which perform the same or similar functions.

DETAILED DESCRIPTION

Figure 1:
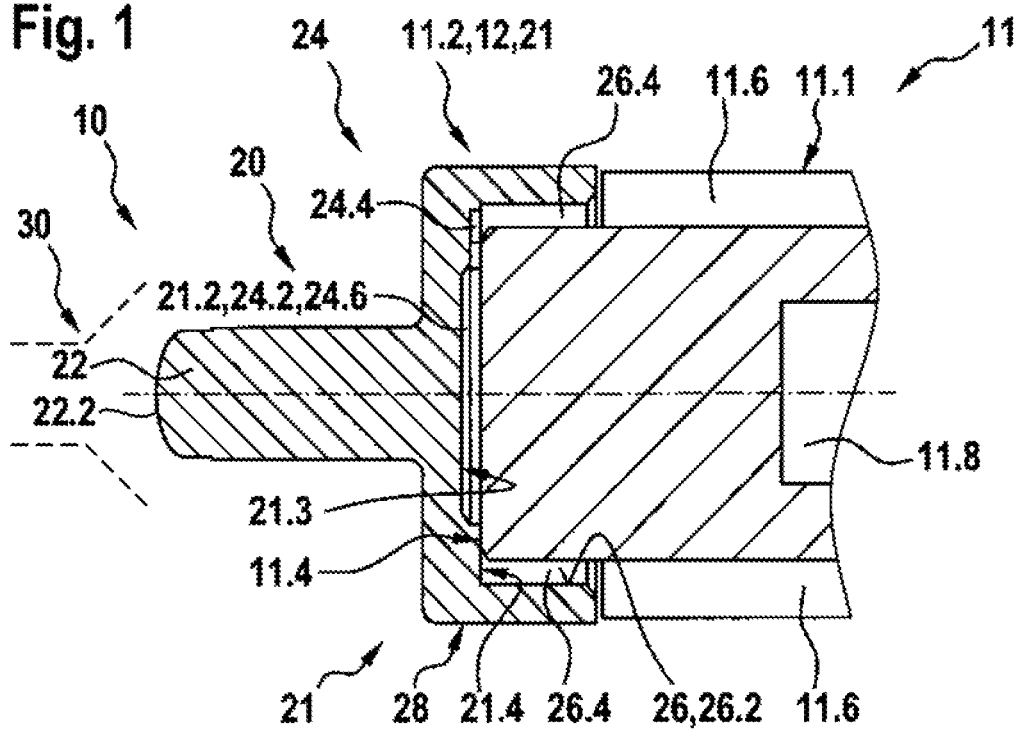
FIG. 1 shows a diagrammatic longitudinal section through an exemplary embodiment of a valve rotor according to the disclosure for a solenoid valve.
Figure 2:
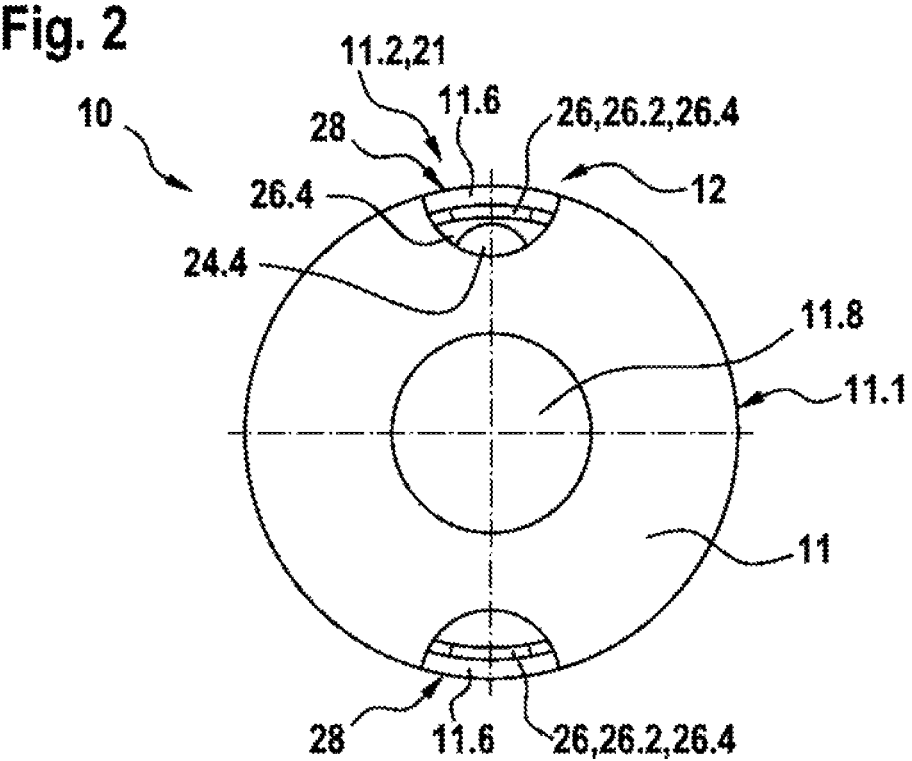
FIG. 2 shows a diagrammatic top view of the valve rotor from FIG. 1.
Figure 3:
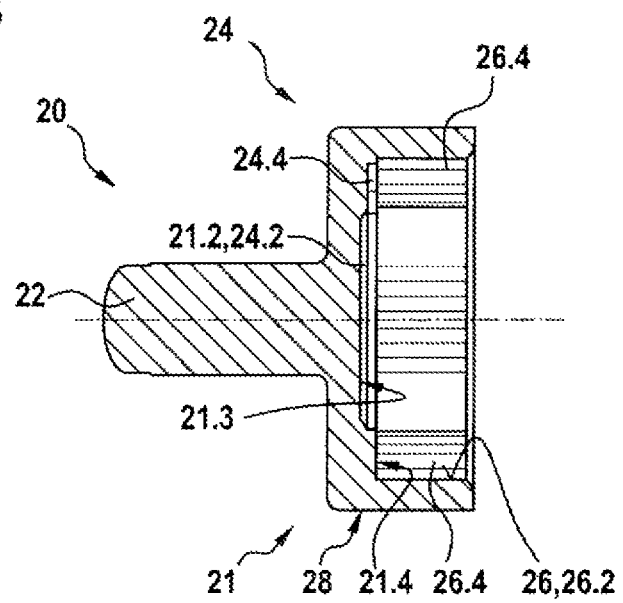
FIG. 3 shows a diagrammatic longitudinal section through an exemplary embodiment of a ram of the valve rotor from FIG. 1 and FIG. 2.
Figure 4:
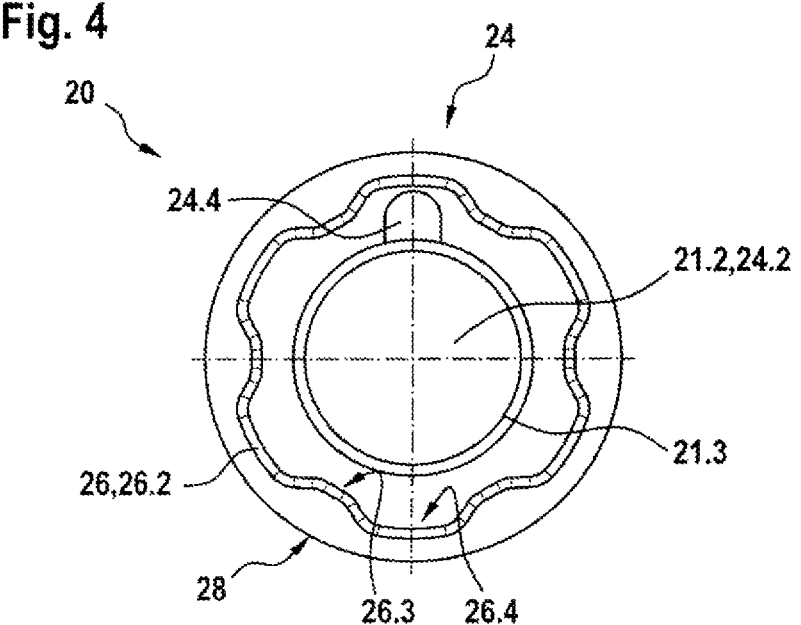
FIG. 4 shows a diagrammatic top view of the ram in FIG. 3.
Figure 5:
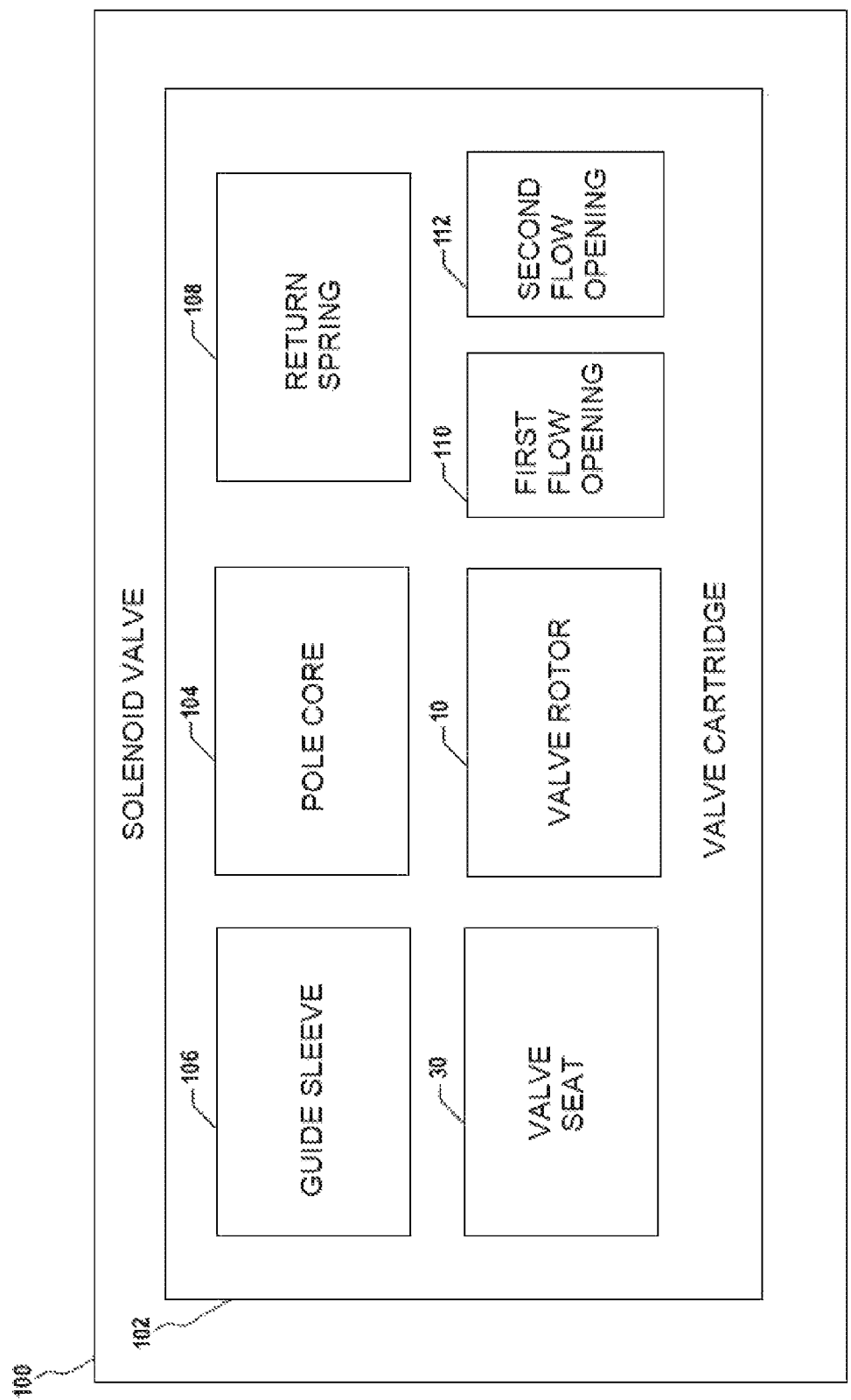
FIG. 5 shows a schematic view of an exemplary embodiment of a valve cartridge for a solenoid valve.

A valve cartridge (not shown) for a solenoid valve has a pole core, a guide sleeve connected to the pole core, a valve rotor 10 guided axially movably inside the guide sleeve against the force of a return spring between a closed position and an open position. The valve rotor 10, as shown in FIGS. 1 and 2, comprises a base body 11 and a ram 20, wherein a valve seat 30 (illustrated schematically in FIG. 1) is arranged between at least one first flow opening and at least one second flow opening. In the closed position, the ram 20 cooperates tightly with the valve seat 30 and interrupts a fluid flow between the at least one first flow opening and the at least one second flow opening. In the open position, the ram 20 is raised from the valve seat 30 and allows the fluid flow between the at least one first flow opening and the at least one second flow opening.

As evident from FIGS. 1 and 2, in the exemplary embodiment shown, the valve rotor 10 for a solenoid valve comprises the base body 11 and the ram 20 cooperating with the valve seat 30. Here, between the ram 20 and the base body 11, a damping device 24 is arranged which has a cavity 24.2 that can be filled with a damping medium, and a choke opening 24.4 through which the damping medium 24.6 flows out of the cavity 24.2 or into the cavity 24.2, wherein the damping device 24 damps a pulse occurring when the ram 20 hits the valve seat 30.

As also evident from FIGS. 1 and 2, in the exemplary embodiment shown, the valve rotor 10 is formed in two pieces. Here, the base body 11 comprises a magnetizable material. In the exemplary embodiment shown, the base body 11 is configured as an iron sintered component. The base body 11 has a cavity 11.8 in which a return spring (not shown) may be guided. Alternatively, the base body 11 may also comprise another magnetizable material. Furthermore, the base body 11, in order to be brought into a predefined form, may be configured as a stamping. When a magnet assembly is powered, a magnetic force is generated which, in a normally open solenoid valve, moves the base body 11 (configured as an iron sintered component) from the open position to the closed position. The ram 20 connected to the base body 11 here hits the corresponding valve seat 30 and seals this. In unpowered state, the return spring moves the base body 11 with the ram 20 back into the starting position, and the ram 20 lifts away from the valve seat 30 and opens it. In a normally closed solenoid valve, the base body 11 with the ram 20 is moved from the closed position to the open position when the magnet assembly is powered, and the ram 20 lifts away from the valve seat 30 and opens it. When the power is switched off, the return spring moves the base body 11 with the ram 20 back in the direction of the valve seat 30, pressing the ram 20 into the valve seat 30 and sealing this. In the exemplary embodiment shown, the ram 20 is made as a plastic injection molding from a thermoplastic. Other suitable materials may also be used to produce the ram 20. A closing body 22.2 is arranged on an end region 22 of the ram 20 facing towards the valve seat 30 and away from the base body 11. In the exemplary embodiment shown, the closing body 22.2 is configured as a spherical cap and molded onto the cylindrical ram 20. Evidently, other suitable geometric shapes may be used for the closing body 22.2 and the ram 20. Thus the ram 20 may for example be configured as a cube or cuboid, and the closing body 22.2 may be configured for example as a cone or truncated cone. In order to achieve an additional damping effect, the closing body 22.2 may be produced as an injection molding, for example as a PEEK part. At the end region 22 facing towards the valve seat 30 and away from the base body 11, the ram 20 has a smaller outer diameter than at the end region 21 facing the base body 11. The ram 20 and the base body 11 are connected together at mutually facing end regions 21, 11.2 via a press joint 12. Here, an end wall 21.4 of the ram 20 facing the base body 11 lies against an end wall 11.4 of the base body 11 facing the ram 20. Furthermore, an inner wall 26 of the ram 20 lies on an outer wall 11.1 of the base body 11. In the exemplary embodiment shown, the ram 20 is placed on the base body 11 and pressed into the base body 11. When the closing body 22.2 hits the valve seat 30, the pulse is transmitted to the ram 20. The pulse is substantially passed on to the damping device 24 between the ram 20 and the base body 11. Thus the damping medium 24.6 flows out of the cavity 24.2 via the choke opening 24.4, which brakes and slows the movement of the ram 20 and may substantially suppress the transmission of a pulse to the base body 11. Thus the closing noise produced may be reduced or even prevented completely. In the open position, the damping medium 24.6 can flow into the cavity 24.2 via the choke opening 24.4. The damping behavior of the damping device 24 may be influenced by the dimensions of the choke opening 24.4.

As further evident from FIGS. 1 to 4, in the exemplary embodiment shown, the choke opening 24.4 is made as a U-shaped groove in the inner wall 26 of the ram 20. In an alternative exemplary embodiment, the choke opening 24.4 may also be configured as an angular opening. Furthermore, in the exemplary embodiment shown, the damping device 24 has only one choke opening 24.4. In an alternative exemplary embodiment, the damping device 24 may comprise several choke openings 24.4.

As further evident from FIGS. 1 to 4, the ram 20 has a recess 21.2 on the end region 21 facing the base body 11. The end wall 11.4 of the end region 11.2 of the base body 11 facing the ram 20, together with the recess 21.2, forms the cavity 24.2 of the damping device 24, wherein in the closed state, the end wall 11.4 of the base body lies on the edge of the recess 21.2. The cavity 24.2 between the ram 20 and the base body 11 weakens in a targeted fashion the stiffness of the mechanical interface of the ram 20 and base body 11, forming a springing element, wherein the spring properties are dependent on the filling with damping medium 24.6 and on a wall thickness of the surrounding walls 11.4, 21.3. Here the choke opening 24.4 and the surrounding walls 11.4, 21.3 have dimensions which prevent damage to the ram 20 from the rising pressure on closure of the solenoid valve 100 in the region of the damping device 24.

As further evident from FIGS. 1 to 4, in the region of the press joint 12, the inner wall 26 of the ram 20 has a contour 26.2 via which the damping medium 24.6 can flow into the cavity 24.2 or out of the cavity 24.2. The contour 26.2 forms contact surfaces 26.3, wherein the contact surfaces 26.3 lie on the outer wall 11.1 of the base body 11 and are connected to the base body 11. Furthermore, the contour 26.2 forms passage channels 26.4, via which the damping medium 24.6 can flow from the outside between the base body 11 and ram 20 towards the choke opening 24.4 and into the cavity 24.2, or towards the outside from the cavity 24.2 and the choke opening 24.4. As well as the formation of passage channels 26.4, at the ram inner wall 26 the contour 26.2 can compensate for different temperature expansion coefficients of the different materials. Also, a settling of the plastic of the ram 20 can be substantially eliminated. The base body 11 comprises an inlet 11.6 which is configured as a groove on the outer wall 11.1. Via the inlet 11.6, the damping medium 24.6 can flow from the outside into the passage channel 26.4 of the ram 20, or flow out from the passage channel 26.4. The outer wall 11.1 of the base body 11 may, in the region of the press joint 12, be arranged flush with an outer wall 28 of the ram 20.

In the valve cartridge 102, the fluid which, in the open position, flows between the first flow opening 110 and the second flow opening 112, can flow into the cavity 24.2 between the base body 11 and the ram 20, and form the damping medium 24.6 for damping the closing noise.

Embodiments of the present disclosure propose a valve rotor and a valve cartridge for a solenoid valve, which due to the use of a damping device between the ram and the base body, advantageously damp the pulse from impact of the ram with a closing body on the valve seat, and thus reduce the body-borne noise in the vehicle. The damping device here comprises a cavity which can be filled with a damping medium, and a choke opening.

What is claimed is:

1. A valve rotor for a solenoid valve, comprising: a ram that cooperates with a valve seat in such a way that the ram interrupts a fluid flow through the solenoid valve when the ram contacts the valve seat; a base body permanently directly connected to the ram and configured to move axially with the ram, the axial movement of the base body delimited by the ram; and a damping device arranged between the ram and the base body, the damping device having a cavity configured to be filled with a damping medium and a choke opening through which the damping medium flows out of the cavity or into the cavity, wherein, when the ram hits the valve seat so as to close the valve, the damping medium flows out of the cavity via the choke opening such that the damping device damps a pulse that occurs when the ram hits the valve seat, wherein the choke opening is configured as a groove defined in an inner circumferential wall of the ram.

2. The valve rotor according to claim 1, wherein the damping behavior of the damping device is influenced by the dimensions of the choke opening.

3. The valve rotor according to claim 1, wherein:

the ram defines a recess at a ram end region that faces towards the base body in an axial direction;

the base body has a base body end wall at a base body end region that faces towards the ram in the axial direction; and the base body end wall and the ram recess define the cavity of the damping device.

4. The valve rotor according to claim 3, wherein:

the ram further includes an axial recess end wall at the ram end region that faces towards the base body;

at least a portion of the base body end wall contacts at least a portion of the axial recess end wall.

5. The valve rotor according to claim 1, wherein the base body comprises a magnetizable material.

6. The valve rotor according to claim 1, wherein the ram is configured as a plastic injection molding.

7. The valve rotor according to claim 1, wherein the ram and the base body are permanently connected together by a press joint.

8. The valve rotor according to claim 7, wherein an inner wall of the ram, in a region of the press joint, has a contour, the contour and an outer wall of the base body defining at least one passage channel through which the damping medium flows into the cavity or out of the cavity.

9. The valve rotor according to claim 8, wherein the ram at least partially surrounds the base body in the region of the press joint.

10. The valve rotor according to claim 9, wherein:

the contour forms at least one contact surface;

the at least one contact surface contacts the outer wall of the base body and is connected to the base body; and one passage channel of the at least one passage channel circumferentially separates each respective contact surface of the at least one contact surface from an adjacent contact surface of the at least one contact surface.

11. The valve rotor according to claim 1, wherein the ram at least partially surrounds the base body.

12. The valve rotor according to claim 1, wherein the groove formed in the inner circumferential wall of the ram is a U-shaped groove when viewed in a cross-section taken perpendicular to an axial direction of the ram.

13. The valve rotor according to claim 1, wherein the base body has an axial end wall that is permanently directly connected to an axial end wall of the ram.

14. The valve rotor according to claim 13, wherein the cavity is defined between the ram and the axial end wall of the base body.

15. A valve cartridge for a solenoid valve, comprising:

a valve seat; and a valve rotor comprising:

a ram that cooperates with the valve seat in such a way that the ram interrupts a fluid flow through the solenoid valve when the ram contacts the valve seat;

a base body permanently directly connected to the ram and configured to move axially with the ram, the axial movement of the base body delimited by the ram; and a damping device arranged between the ram and the base body, the damping device having a cavity configured to be filled with a damping medium and a choke opening through which the damping medium flows out of the cavity or into the cavity, wherein, when the ram hits the valve seat so as to close the valve, the damping medium flows out of the cavity via the choke opening such that the damping device damps a pulse that occurs when the ram hits the valve seat, wherein the choke opening is configured as a groove defined in an inner circumferential wall of the ram.

16. The valve cartridge according to claim 15, wherein the fluid flow through the solenoid valve flows into the cavity between the base body and the ram and forms the damping medium.

17. The valve cartridge according to claim 15, wherein:

the ram defines a recess at a ram end region that faces towards the base body in the axial direction;

the base body has a base body end wall at a base body end region that faces towards the ram in the axial direction;

the base body end wall and the ram recess define the cavity of the damping device; and when the ram contacts the valve seat so as to interrupt the fluid flow through the solenoid valve, the base body end wall contacts the ram recess.

18. The valve cartridge according to claim 15, wherein the base body has an axial end wall that is permanently directly connected to an axial end wall of the ram.

19. The valve cartridge according to claim 18, wherein the cavity is defined between the ram and the axial end wall of the base body.

\* \* \* \* \*